(12) United States Patent
Mistry (10) Patent No.: US 7,066,737 B1
(45) Date of Patent: Jun. 27, 2006

(54) READING/TEACHING AID (76) Inventor: Arvind Khandubhai Mistry, 5 Wainfleet Close, Ilkeston, Derbyshire DE7 9HR (GB)

( * ) Notice: Subject to any disclaimer, the term of this patent is extended or adjusted under 35 U.S.C. 154(b) by 857 days.

(21) Appl. No.: 10/049,915

(22) PCT Filed: Aug. 8, 2000

(86) PCT No.: PCT/GB00/03049

§ 371 (c)(1),
(2), (4) Date: Feb. 13, 2002

(87) PCT Pub. No.: WO01/13348

PCT Pub. Date: Feb. 22, 2001

(30) Foreign Application Priority Data

Aug. 13, 1999 (GB) ................................ 9919019.1

(51) Int. Cl.
*G09B 17/04* (2006.01)
(52) U.S. Cl. ........................ 434/178; 434/183
(58) Field of Classification Search ................ 434/162, 434/166, 178, 179, 183, 307, 307 A; 401/52, 401/195
See application file for complete search history.

(56) References Cited

U.S. PATENT DOCUMENTS

| 2,586,723 | A | * | 2/1952 | Sakols .......................... 385/34 |
| 2,627,227 | A | * | 2/1953 | Claggett et al. ............. 101/333 |
| 3,248,805 | A | | 5/1966 | Alper et al. |
| 3,878,327 | A | | 4/1975 | Uhler |
| 4,078,319 | A | | 3/1978 | Mazewski et al. |
| 4,090,356 | A | * | 5/1978 | Arnold ........................ 368/93 |
| 5,338,201 | A | | 8/1994 | Levine |
| 5,961,333 | A | * | 10/1999 | Harrison et al. ............. 434/322 |
| 6,139,329 | A | * | 10/2000 | Mino et al. .............. 434/307 A |
| 6,669,480 | B1 | * | 12/2003 | Chesters ...................... 434/178 |

FOREIGN PATENT DOCUMENTS

| DE | 19603381 | 8/1997 |
| GB | 2297186 | 7/1996 |

* cited by examiner

*Primary Examiner*—Kien Nguyen
(74) *Attorney, Agent, or Firm*—MacMillan, Sobanski & Todd, LLC (57) ABSTRACT

A method of reading using a reading aid (12) including a handle part (14) which is adapted to be gripped manually at a location spaced from text to be read, and a cursor part (15) attached to the handle part (14) and extending transversely thereto, handle part (14) and the cursor part (15) being attached by a joint (18) which permits the handle part (14) to be moved relative to the cursor part (15) during reading, the cursor part (15) being positionable by manipulating the handle part (14) to indicate a part of a line of the text being read, the method including moving the cursor part (15) along the line and/or down the text during reading to indicate successive words or groups of words, whilst manipulating the handle part (14) relative to the cursor part (15) so that the handle part (14) is maintained out of the reader's line of sight whilst the cursor part (15) is maintained generally flat against the text.

17 Claims, 6 Drawing Sheets

READING/TEACHING AID

FIELD OF THE INVENTION

This invention relates to a device which may be used for aiding poor readers to improve their reading ability, and to enable competent readers too, to improve their reading ability.

BACKGROUND OF THE INVENTION

The amount of printed matter is ever increasing, as is the requirement to read text on a computer screen accurately and efficiently. There are two elements to efficient reading namely reading speed, and comprehension of what is being read.

When reading, a reader's eyes move relative to stationary text. The reader's eyes do not move smoothly along the text, but rather perform a series of jerky movements consisting of jumps and stops. It is during the stops that information is taken into the brain. During reading, words tend not to be read one word at a time, but as a group of words along a line.

In the case of a poor reader, the jumps and stops do not flow along the lines of text, but sometimes backtrack and back skip. A backtrack is when the eyes jump backwards to what has been read, and a back skip is when the eyes jump backwards more than just the last group of read words. The back skip can be along a line, over several lines, or even may be a paragraph of the text.

In the case of a good reader though, the eyes are trained to move with longer jumps and hence there are less stops, for there are shorter pauses for the stops, and less or no backtracking or back skipping. Such eye movements enable information to be more smoothly conveyed to the brain, such improved presentation enables improved comprehension of the text being read.

It is common practice for a reader to use a pointer whilst reading, the pointer pointing to individual words as they are read.

SUMMARY OF THE INVENTION

According to a first aspect of the invention I provide a method of reading using a reading aid including a handle part which is adapted to be gripped manually at a location spaced from text to be read, and a cursor part attached to the handle part and extending transversely thereto, the handle part and the cursor part being attached by a joint which permits the handle part to be moved relative to the cursor part during reading, the cursor part being positionable by manipulating the handle part to indicate a part of a line of the text being read, the method including moving the cursor part along the line and/or down the text during reading to indicate successive words or groups of words, whilst manipulating the handle part relative to the cursor part so that the handle part is maintained out of the reader's line of sight whilst the cursor part is maintained generally flat against the text.

Thus by performing the method of the invention, a reader may be trained to read without backtracking and back skipping, and by moving the cursor part appropriately relative to the text, reading speed and comprehension may be improved.

Preferably the handle part is thin so that the handle part does not obscure the text being read. The handle part and the cursor part may be attached by a joint which permits the handle part to be moved universally relative to the cursor part during reading. Alternatively, the handle part and the cursor part may be attached by a joint that permits substantially universal movement of the handle part with respect to the cursor part, but restricts rotation of the handle about a longitudinal axis of the handle part.

The handle part may be attached approximately centrally along the length of the cursor part. Hence the reader's eyes are encouraged to concentrate on the centre of the text being read.

The method may be applied to the reading of any text, including the reading of text from computer screens. However the invention is particularly useful for reading columns in newspapers and magazines, in which case the cursor part may be of a length substantially equal to the width of the columns being read. Thus a reader may be encouraged to read a group of words consisting of the entire line of the column.

Alternatively, the cursor part may have a length of greater than two words of average length of text.

It will be appreciated, however, that for readers of different ability, and/or for reading different text, ideal cursor part lengths may differ. Accordingly in a preferred embodiment, the reading aid may have separable handle and cursor parts, and may be made of a cursor part selected from a set of cursor parts of different configuration, by attaching the selected cursor part to the handle part.

In each case, the cursor part of the reading aid may be opaque in which case the cursor part is, during performance of the method, positioned beneath or above the word or groups of words to be indicated, or a portion of the cursor part may be transparent so that the method may include positioning the cursor part relative to the text such that at least a portion of the line of text to be indicated is visible to the reader through the transparent portion. In yet another arrangement, the cursor part may include a frame through which text may be read.

The method may include adjusting the length of the handle part to suit an individual reader and/or to enable the length of the handle part to be extended from a retracted stowed position for use. The method may include unfolding the cursor part from a stowed position in which the cursor part and handle part are substantially parallel, to a position for use where the cursor part extends at substantially right angles relative to the handle part.

The cursor part may be a unitary structure, or may include a pair of relatively foldable wings which may be folded so as to extend generally parallel to the handle part.

The cursor part may be configured to form an image that may be appealing to children.

According to a second aspect of the invention I provide a reading aid for use in the method of the first aspect of the invention.

The aid may include a writing implement such as a highlighter, integrally provided with the handle part. For example, a writing point may be provided at an end of the handle part remote from the cursor part, or the handle part may include a main stem and a branch including the writing implement.

According to a third aspect of the invention, I provide a reading aid including a cursor part and a handle part, the cursor part being attached to the handle part by a joint, the joint being configured to permit substantially universal movement of the handle part with respect to the cursor part, about a longitudinal axis of the handle part.

According to a fourth aspect of the invention, I provide a reading aid including a cursor part and a handle part, the cursor part being configured to form an image which may be attractive to children.

According to a fifth aspect of the invention I provide a computer when programmed to aid reading or to train a reader, there being means to display on a display screen of the computer concurrently with displaying on the display screen text to be read, a cursor, the computer being programmed to position the cursor to indicate a word or group of words of the line of the text being read and to move the cursor along the line during reading successively to indicate groups of words.

Preferably the computer is programmed so that the speed at which the cursor is moved along the line of text and/or the number of words indicated may be changed as a reader's ability improves.

The computer may be programmed to move the cursor relative to the text being read in a predetermined path over the text as a whole in such manner as to improve the speed of the reading.

Although the cursor may simply indicate the word or group of words, for example by underlining, or emboldening the group of words, the cursor may frame the word or group of words.

In one arrangement text which is framed may be enlarged compared within the remaining text. This is particularly useful when reading small font text e.g. in cells in spreadsheets.

The cursor may form an image which may be attractive to children.

According to a sixth aspect of the invention, we provide a method of operating a computer according to the fifth aspect of the invention including the steps of moving a cursor relative to text to be read on a display screen, successfully to indicate words or groups of words of a line of text to be read.

The method of the sixth aspect of the invention may include changing the size and/or shape and/or colour of the cursor to suit different reader's abilities and/or the nature of the text being read.

According to a seventh aspect of the invention we provide a method of assessing reading ability including the steps of displaying on a computer display screen concurrently with text to be read, a cursor, manually moving the cursor relative to the text to indicate lengths of the text sequentially being read, and analysing from the speed and sequence of cursor movements, reading ability.

The invention will now be described with reference to the accompanying drawings in which:

DETAILED DESCRIPTION OF THE INVENTION

Figure 1:
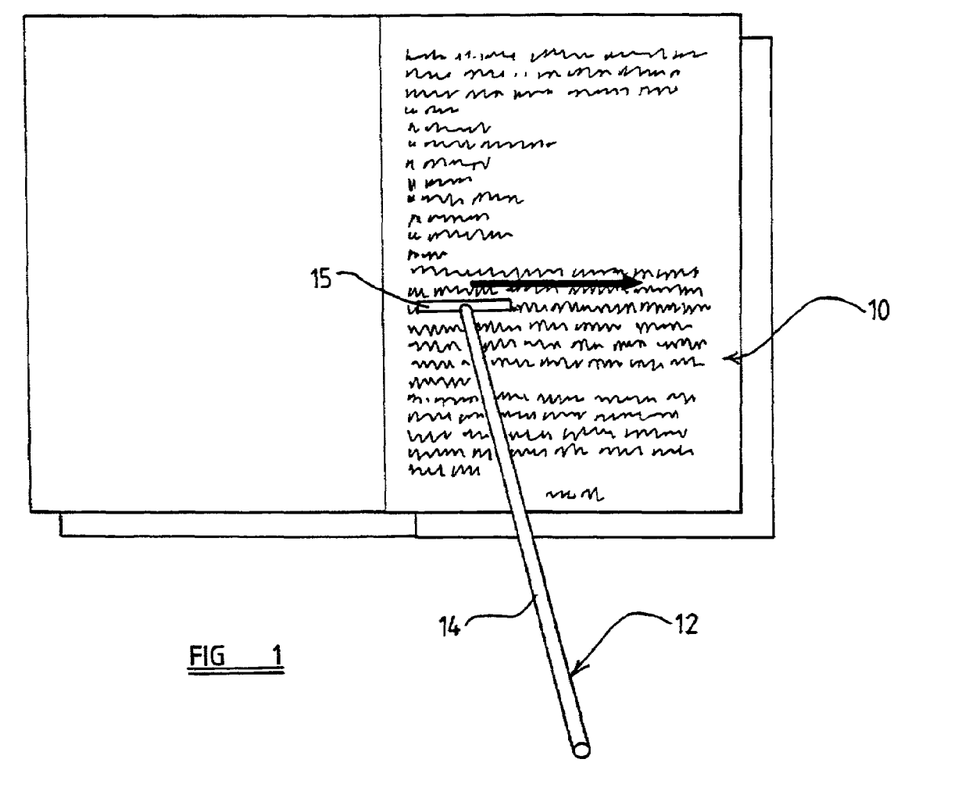
FIG. 1 shows a reading aid of the second aspect of the invention in use.

Referring to FIG. 1 there is shown a page 10 of text to be read, the text consisting of individual words arranged in lines down the page 10. The page may be a page of text of a printed publication such as a newspaper, magazine or book, or text on a computer screen.

To promote efficient reading, a reading aid 12 is used, the reading aid 12 including a handle part 14 which is long and thin and in this embodiment is of fixed length, and a cursor part 15 attached to the handle part 14 by means of a joint 18. In this example, the handle part 14 is joined to the cursor part 15, with the cursor part 15 extending generally normally relative to the handle part 14 and being positionable by manipulating the handle part 14 to indicate a part of a line of the text being read. Also in this example, the cursor part 15 extends for a length greater than two words of average length of the text, however, the length of the cursor part 15 may be greater or smaller than this.

The method of the invention is performed by a reader grasping the handle part 14 at a position spaced from the text 10, and with the cursor part 15 positioned beneath or above a line of the text to indicate a word or group of words, as the reader reads, the cursor part 15 is moved along the line of text and down the text by manipulating the handle part 14 and the joint 18, so that the reader's eyes are deterred from backtracking or back skipping, and are encouraged to move in regular jumps or continuously alone the line of text, in one direction.

In the remaining figures, different embodiments of reading aid 12 are illustrated, and similar parts to the reading aid 12 of FIG. 1 are indicated by the same reference numerals.

Figure 2:
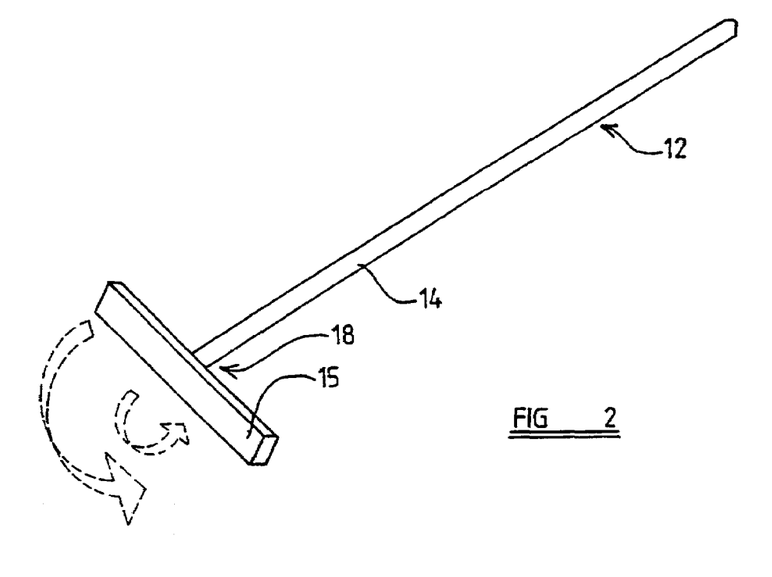
FIGS. 2 to 11 show various embodiments of reading aids for use in the method of the first aspect of the invention.
Figure 3:
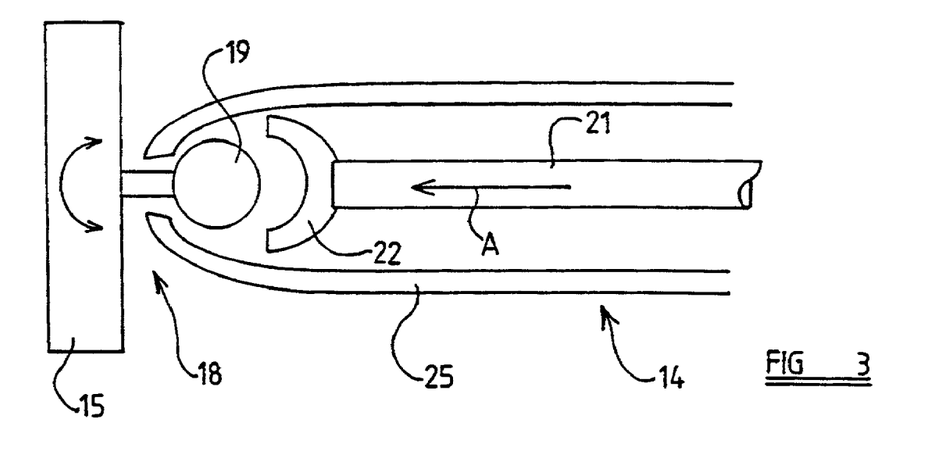

In FIG. 2, the cursor pail 15 is attached to the handle part 14 by a joint 18 which permits of generally universal movement of the cursor part 15 relative to the handle pail 14 so that the handle part 14 may be maintained out of a reader's line of sight of the words indicated by the cursor part 15 during reading, particularly as the cursor part 15 is moved down the text. In FIG. 3, one example of a suitable universal joint 18 is shown, in which the cursor part 15 has secured thereto a ball formation 19, and the handle part 14 has an internal longitudinal part 21 terminating in a cup 22. The cup 22 and ball formation 19 may be brought into tight engagement by moving the internal part 21 longitudinally relative to an outer handle part 25, in the direction of the arrow A. This may be achieved by a screw connection between the internal part 21 and the outer handle part 25, or by interengaging ratchets or otherwise.

Thus by tightening the engagement of the ball formation 19 and the cup 22, the position of the cursor part 15 may be releasably fixed to the handle part 14.

Figure 4:
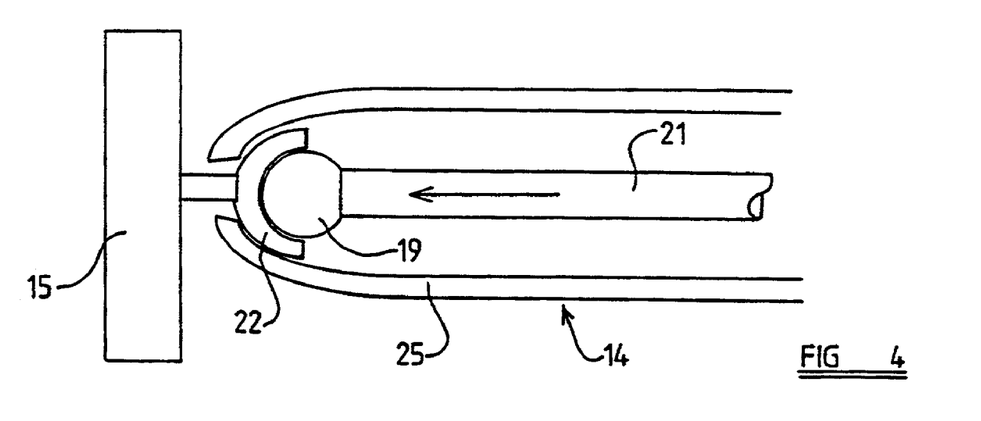

FIG. 4 shows a similar but opposite arrangement in which the cup 22 is provided on the cursor part 15 and a ball formation 19 is provided at the end of an internal part 21 of the handle part 14.

Figure 5:
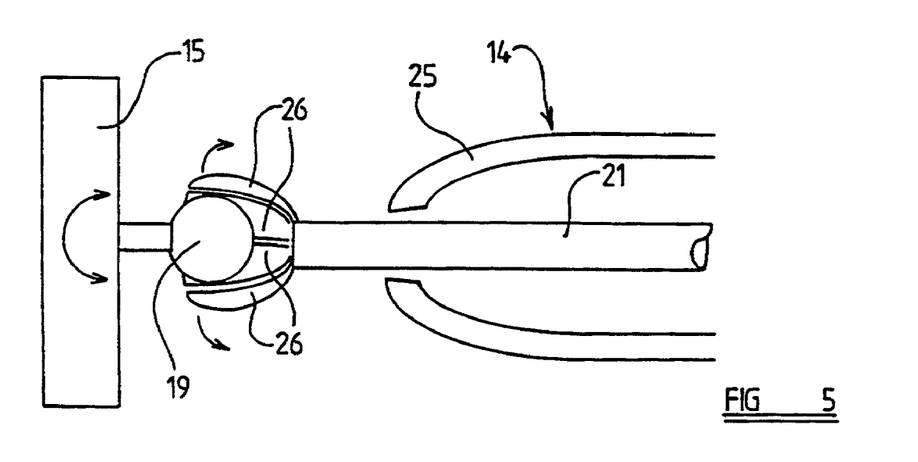

FIG. 5 shows an alternative arrangement in which an internal part 21 of the handle part 14 terminates in a plurality of jaws 26 which may be closed about a ball configuration part 19 of the cursor part 15, e.g. by actuating by rotation or longitudinal movement, an actuator within the internal part 21 of the handle part 14.

Figure 6:
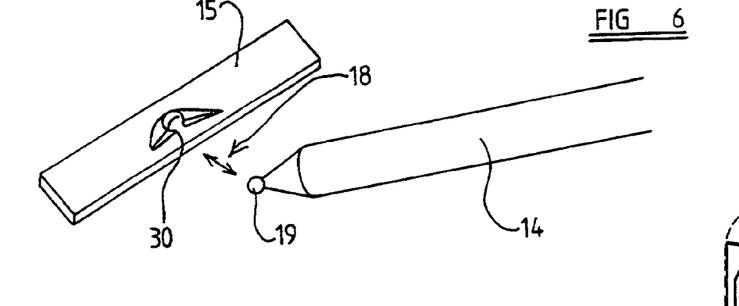

FIG. 6 illustrates a universal joint arrangement 18 in which the handle part 14 has an integral ball formation 19 and the cursor part 15 has a recess formation 30, the ball 19 and recess 30 formations being snap interengageable.

In the embodiments so far described with reference particularly to FIGS. 5 to 6, because the cursor part 15 and handle part 14 are separable it will be appreciated that by providing a set of cursor parts 15 of different dimension (lengths) and configuration, a reading aid 12 suitable for a particular reader may be made up, or a reading aid 12 suitable for aiding reading of particular text, such as a column of a newspaper, in which case a cursor part 15 of a width corresponding to the width of the column may be selected.

Figure 7:
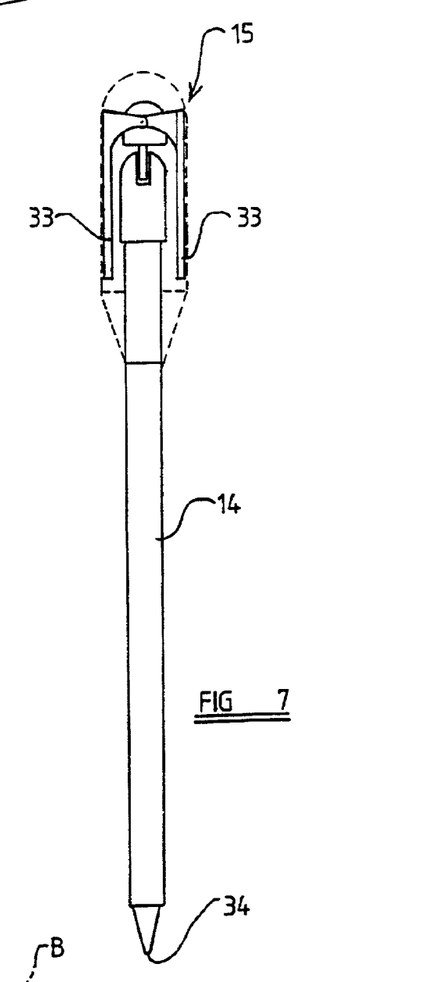

FIG. 7 illustrates an arrangement in which the cursor part 15 is not separable from the handle part 14, but the cursor part 15 includes a pair of wings 33 which may be folded from an outwardly extending condition for use, to the folded condition shown in which the wings 33 extend generally parallel to the handle part 14. In this embodiment, at an end of the handle part 14 remote from the cursor part 15, there is provided a writing point 34 of a writing implement such as a highlighter which is integrally provided within the handle part 14.

Figure 8:
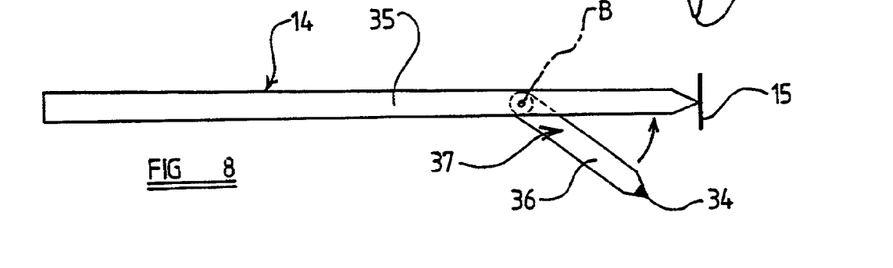

In FIG. 8, an alternative arrangement for including a writing implement is illustrated. In this arrangement, the handle part 14 has a main stem 35 which is grasped by a reader during reading, and a branch 36 which includes a writing implement 37 such as a highlighter with a writing point 34. In the embodiment illustrated, the branch is pivotal relative to the main stem 35 about a pivot B so that the writing implement 37 may be folded alongside the main stem 35, or into a recess of the stem 35 when not in use, or pivoted outwardly for use. In another arrangement the writing implement 37 may be provided in the main stem 35 and the cursor part 15 on the branch 36. Such latter arrangement enables a user to exercise more control over the use of the writing implement 37 than where the writing implement 37 is provided on the branch 36. In each case, instead of being pivoted, the branch 36 and main stem 35 may be relatively fixed.

Figure 9:
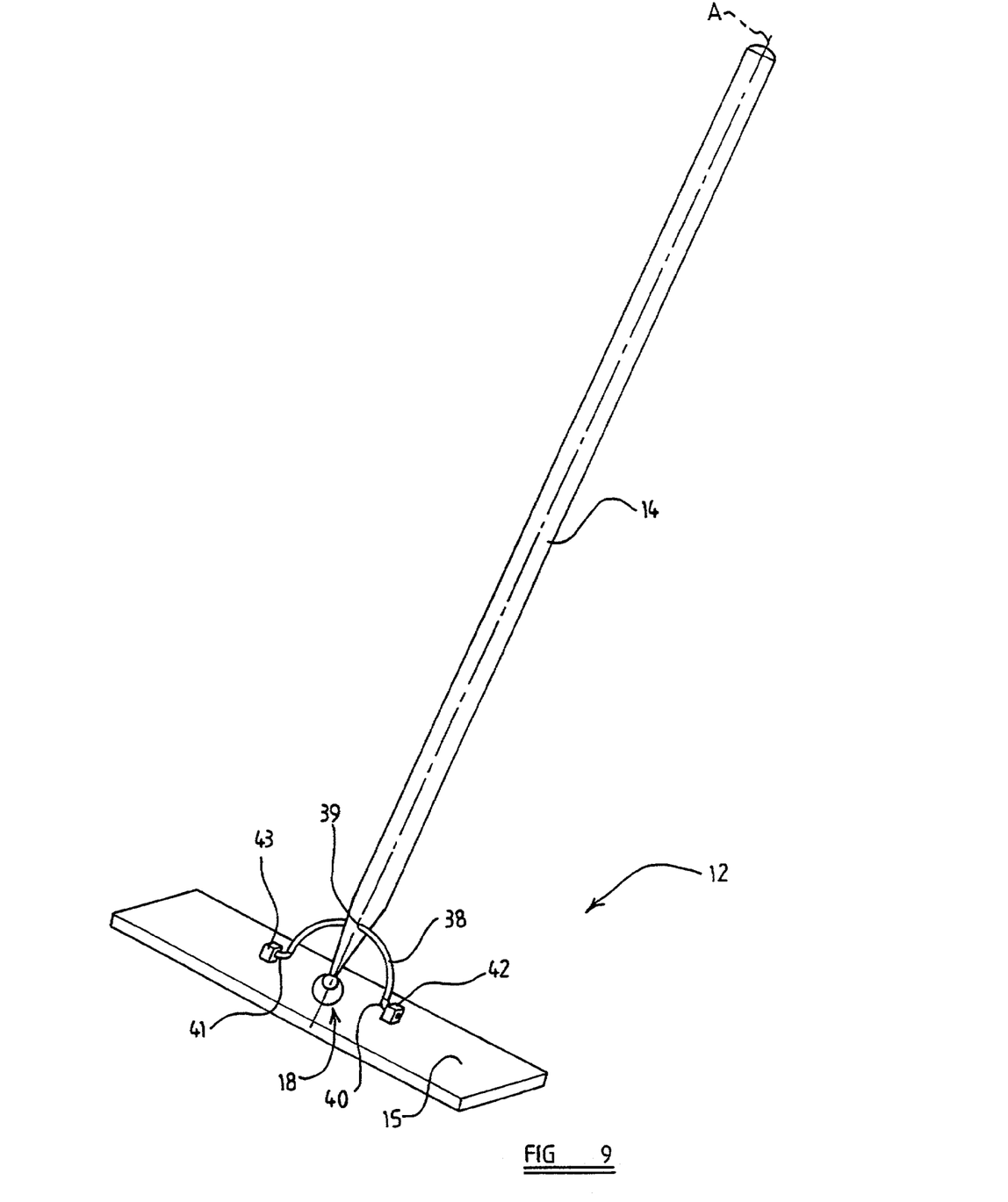
Figure 10:
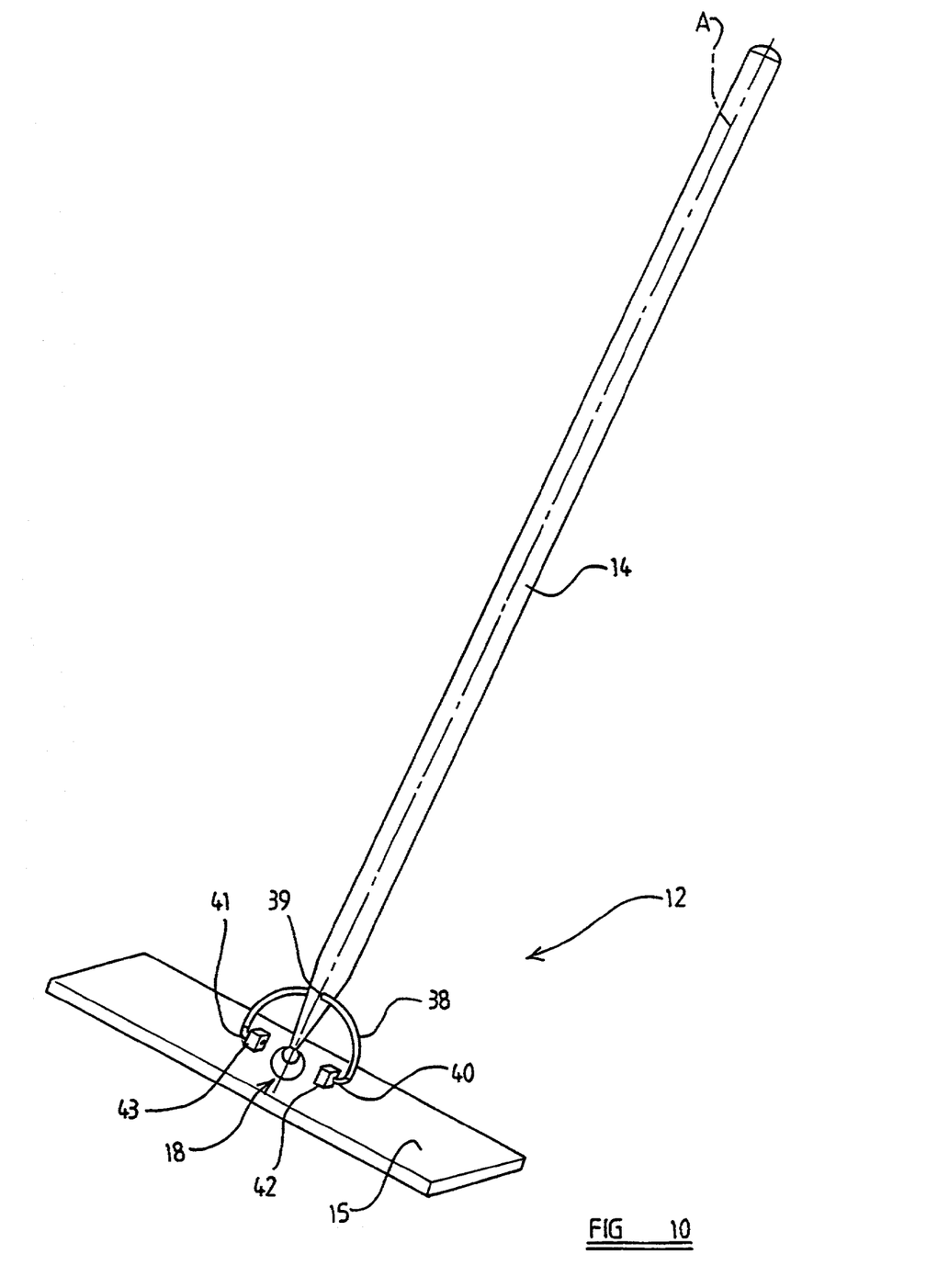

FIGS. 9 and 10 illustrate an alternative embodiment of the invention, in which the cursor part 15 is connected to the handle part 14 by means of a joint 18 which would be universal, as illustrated in FIGS. 3 to 6, were it not for the provision of a restraining part 38, which restricts rotation of the handle part 14 about a longitudinal axis A of the handle part 14. By virtue of the restraining part 38, the user may more easily maintain the cursor parallel to lines of text when moving the reading aid 12 over a page.

The restraining part 38 is wire bent into a generally semi-circular configuration, which extends through an aperture 39 provided in the handle part 14. The restraining part 38 is pivotally connected to the cursor part 15, at a first 40 and second 41 end, by two attachment means 42, 43.

In order to engage with the attachment means 42, 43, the ends 40, 41 of the restraining part 38 may be bent radially outwardly of the semi-circle formed by remainder of the restraining means 38, as shown in FIG. 9, or may be bent radially inwardly of the semi-circle, as shown in FIG. 10. The universal joint 18 is located generally centrally between the two attachment means 42, 43, and generally at the centre of the semi-circle formed by the restraining part 38.

The attachment means 42, 43 are oriented with respect to the cursor part 15 such that the restraining part 38 may pivot about an axis parallel to a longitudinal axis of the cursor part is. The clearance between the handle part 15 and the restraining part 38 provided by the aperture 39 allows movement of the restraining part 38 within the aperture 39, and therefore allows pivoting of the handle part 14 about the universal joint 18 with respect to the restraining part 38. Thus, the restraining part 38 acts only to restrict rotation of the handle part 14 relative to the cursor part 15 about its longitudinal axis A.

Figure 11:
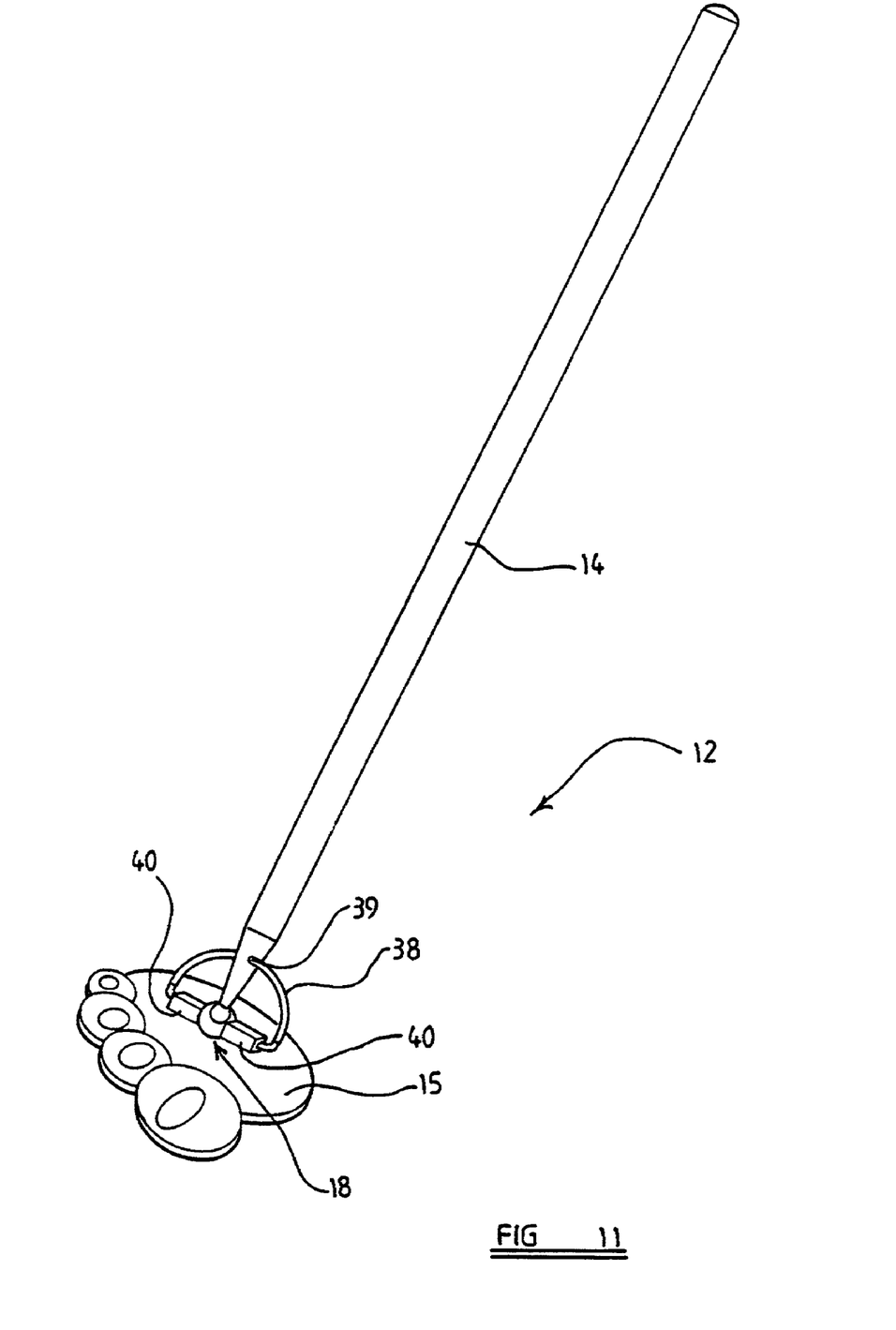

In FIG. 11, an alternative configuration of cursor part 15 is illustrated. In this embodiment the reading aid 12 is intended for use by a child, and the cursor part 15 is configured to resemble a paw print of a bear. The cursor part 15 may be configured to form any other image that may be popular with children, for examples, an animal, a cartoon character, or a football player. Such a cursor part configured to form a popular image may be used in any of the above embodiments of the invention.

If desired, a method of assisting reading may be performed on a computer by concurrently displaying with text on a display screen, a cursor to indicate a group of words in a line of text to be read. In such an arrangement, the cursor displayed may have a length greater than two words of average length of the text, but could also be shorter than this. The computer may be arranged to move the cursor relative to the text, or the cursor may be moved under the control of a reader. If desired, the speed of movement of the cursor relative to the text may be voice controlled, where the reader is reading out loud, or controlled using a pointing device such as a mouse.

The computer when in control, may move the cursor at an optimum speed for the reader's ability, and the speed may be changed as the reader's ability improves.

Thus the computer may be arranged to assess the reader's ability by the reader controlling the cursor movement during an assessment, either using a pointing device such as a mouse, trackball or the like, or by voice actuated control, and the computer being programmed to analyse the cursor speed and movement to determine the reader's ability.

The computer may be programmed to train the reader's eye movements, by increasing the speed of cursor movement as the reader's ability improves, and/or by moving the cursor over the whole text in a predetermined pattern designed to improve reading speed.

The size and configuration of the cursor may be changeable. In one arrangement, the cursor may simply underline the group of words being read at any instant. In a preferred arrangement, the cursor frames the word or group of words. If desired the text of the framed word or group of words may be highlighted by emboldening, enlarging or otherwise.

If desired, in highlighting a word or group of words, otherwise hidden text may be revealed.

These latter features are particularly helpful for use in reading text in cells of a spreadsheet.

The cursor may form an image which may appeal to children.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

I claim:

1. A method of reading using a reading aid including a handle part which is adapted to be gripped manually at a location spaced from text to be read, and a cursor part attached to the handle part and extending transversely thereto, the handle part and the cursor part being attached by a joint which permits the handle part to be moved relative to the cursor part during reading, comprising forming the joint to permit substantial universal movement of the handle part relative to the cursor part, positioning the cursor part by manipulating the handle part to indicate a part of a line of the text being read, moving the cursor part selectively along the line and down the text during reading to indicate successive words or groups of words, and manipulating the handle part relative to the cursor part so that the handle part is maintained out of the reader's line of sight while the cursor part is maintained generally flat against the text.

2. A method according to claim 1, and forming the handle part to be thin so that the handle part does not obscure the text being read.

3. A method according to claim 1 and configuring the joint to permit substantial universal movement of the handle part relative to the cursor part, but to restrict rotation of the handle part with respect to the cursor part, about a longitudinal axis of the handle part.

4. A method according to claim 3, and providing the joint with a restraining part which is pivotally connected to the cursor part, and which cooperates with the handle part so as to restrict rotation of the handle part with respect to the cursor part, about a longitudinal axis of the handle part.

5. A method according to claim 1, forming a portion of the cursor part to be transparent, and positioning the transparent portion of the cursor part relative to the text such that at least a portion of the line of text to be indicated is visible to the reader through the transparent portion of the cursor part.

6. A method according to claim 1, and forming the cursor part to include a frame through which text may be read.

7. A method according to claim 1, and adjusting the length of the handle part to one of suit an individual reader and enable the length of the handle part to be extended from a retracted stowed position for use.

8. A method according to claim 1, and unfolding the cursor part from a stowed position in which the cursor part and handle part are substantially parallel, to a position for use where the cursor part extends at substantially right angles relative to the handle part.

9. A method according to claim 1, and further comprising changing at least one of the size, shape, and color of the cursor to suit different reader' abilities or the nature of the text being read.

10. A method of reading using a reading aid including a handle part which is adapted to be gripped manually at a location spaced from text to be read, and a cursor part attached to the handle part and extending transversely thereto, the handle part and the cursor part being attached by a joint which permits the handle part to be moved relative to the cursor part during reading, comprising attaching the handle part approximately centrally along the length of the cursor part whereby the reader's eyes are encouraged to concentrate on the center of the text being read, positioning the cursor part by manipulating the handle part to indicate a part of a line of the text being read, moving the cursor part selectively along the line and down the text during reading to indicate successive words or groups of words, and manipulating the handle part relative to the cursor part so that the handle part is maintained out of the reader's line of sight while the cursor part is maintained generally flat against the text.

11. A method according to claim 10, wherein the text is on a computer screen, or is printed text.

12. A method according to claim 10, and applying the reading aid for reading a column in a newspaper or magazine, and forming the cursor part to be of a length substantially equal to the width of the column being read.

13. A method according to claim 10, and forming the cursor to have a length greater than two words of average length of the text being read.

14. A method of reading using a reading aid including a handle part which is adapted to be gripped manually at a location spaced from text to be read, and a cursor part attached to the handle part and extending transversely thereto, the handle part and the cursor part being attached by a joint which permits the handle part to be moved relative to the cursor part during reading, comprising positioning the cursor part by manipulating the handle part to indicate a part of a line of the text being read, moving the cursor part selectively along the line and down the text during reading to indicate successive words or groups of words, and manipulating the handle part relative to the cursor part so that the handle part is maintained out of the reader's line of sight while the cursor part is maintained generally flat against the text, and further forming the reading aid to have separable handle and cursor parts, and selecting a cursor part from a set of cursor parts of different configuration and attaching the selected cursor part to the handle part.

15. A method of reading using a reading aid including a handle part which is adapted to be gripped manually at a location spaced from text to be read, and a cursor part attached to the handle part and extending transversely thereto, the handle part and the cursor part being attached by a joint which permits the handle part to be moved relative to the cursor part during reading, comprising positioning the cursor part by manipulating the handle part to indicate a part of a line of the text being read, moving the cursor part selectively along the line and down the text during reading to indicate successive words or groups of words, and manipulating the handle part relative to the cursor part so that the handle part is maintained out of the reader's line of sight while the cursor part is maintained generally flat against the text, and further including the steps of forming the cursor part of the reading aid to be opaque, and positioning the opaque cursor part during reading beneath or above the word or group of words to be indicated.

16. A method of reading using a reading aid including a handle part which is adapted to be gripped manually at a location spaced from text to be read, and a cursor part attached to the handle part and extending transversely thereto, the handle part and the cursor part being attached by a joint which permits the handle part to be moved relative to the cursor part during reading, comprising forming the cursor part to include a pair of relatively foldable wings which may be folded so as to extend generally parallel to the handle part, positioning the cursor part by manipulating the handle part to indicate a part of a line of the text being read, moving the cursor part selectively along the line and down the text during reading to indicate successive words or groups of words, and manipulating the handle part relative to the cursor part so that the handle part is maintained out of the reader's line of sight while the cursor part is maintained generally flat against the text.

17. A reading aid comprising a handle part which is adapted to be gripped manually at a location spaced from text to be read, and a cursor part attached to the handle part and extending transversely thereto, the handle part and the cursor part being attached by a joint which permits the handle part to be moved relative to the cursor part during reading, and wherein the joint is configured to permit substantially universal movement of the handle part relative to the cursor part but restricts rotation of the handle part with respect to the cursor part about a longitudinal axis of the handle part.

* * * * *